United States Patent
Goodwill et al.

(10) Patent No.: US 7,366,370 B2
(45) Date of Patent: Apr. 29, 2008

(54) TECHNIQUE FOR PHOTONIC SWITCHING

(75) Inventors: Dominic John Goodwill, Kanata (CA); Mirjana Vukovic, Nepean (CA)

(73) Assignee: Nortel Networks Limited, St. Laurent, Quebec ( * ) Notice: Subject to any disclaimer, the term of this patent is extended or adjusted under 35 U.S.C. 154(b) by 197 days.

(21) Appl. No.: 10/921,953

(22) Filed: Aug. 20, 2004

(65) Prior Publication Data
US 2006/0039705 A1    Feb. 23, 2006

(51) Int. Cl.
H04J 14/00    (2006.01)
H04J 14/02    (2006.01)

(52) U.S. Cl. .......................... 385/24; 398/48; 398/79; 398/82; 398/83

(58) Field of Classification Search .................. 385/24
See application file for complete search history.

(56) References Cited

U.S. PATENT DOCUMENTS 5,639,386 A * 6/1997 Burke et al. ................. 216/27
6,522,812 B1 * 2/2003 Nikonov ....................... 385/37
6,913,705 B2 * 7/2005 Nakata ........................ 216/24
2002/0191250 A1 * 12/2002 Graves ....................... 359/128
2003/0099018 A1 * 5/2003 Singh et al. ................. 359/152
2004/0054961 A1 * 3/2004 Dubey et al. ................ 714/801
2004/0091198 A1 * 5/2004 Graves ......................... 385/16

* cited by examiner

Primary Examiner—Frank G. Font
Assistant Examiner—Mary El-Shammaa
(74) Attorney, Agent, or Firm—Hunton & Williams LLP

(57) ABSTRACT

A technique for photonic switching is disclosed. In one particular exemplary embodiment, the technique may be realized as a method for photonic switching. The method may comprise receiving at least one optical signal at a photonic line card, wherein the at least one optical signal comprises one or more wavelength channels and the photonic line card comprises at least one integrated optical switch. The method may also comprise routing at least one of the one or more wavelength channels through the at least one integrated optical switch to a photonic bus, wherein the photonic bus comprises a plurality of optical paths and each of the plurality of optical paths is capable of carrying multiple wavelength channels.

12 Claims, 10 Drawing Sheets

TECHNIQUE FOR PHOTONIC SWITCHING

FIELD OF THE DISCLOSURE

The present disclosure relates generally to optical telecommunications and, more particularly, to a technique for photonic switching incorporating an internal dilated photonic bus.

BACKGROUND OF THE DISCLOSURE

In optical telecommunication networks, a photonic switching node (PSN), which is also known as a photonic cross-connect (PXC) or a photonic-switched wavelength-grooming network node, performs a primary function of routing an input optical signal to one or more output ports. The input optical signal may comprise one or more wavelength channels. A "wavelength channel" is an optical signal with a single wavelength. One example of multiple-wavelength optical signal is a dense wavelength division multiplexed (DWDM) signal. The PSN may route one of the wavelength channels and output an optical signal comprising the same wavelength channel. Through photonic switching, the PSN provides flexibility points in the network for traffic grooming, fiber protection, and wavelength conversion.

One prior art photonic switching node architecture is illustrated in FIG. 1. A same or similar architecture is described in U.S. patent application Ser. No. 10/286,781, entitled "Modular Photonic Switch with Wavelength Conversion," filed Nov. 4, 2002, which is hereby incorporated herein in its entirety. As shown in FIG. 1, a typical multi-wavelength switch plane photonic network node (PSN) consists of a set of photonic switch fabric cards #1-#8 and multiple instances of photonic line cards #1-#16. The ingress and egress sides of the respective line card are shown separately, for the purpose of better illustration of the signal flow; although in reality each card contains ingress and egress part on it. Each ingress line card receives input signals comprising one or more wavelengths via a plurality of ingress optical network fibers 102, demultiplexes the input signals into wavelength channels (e.g., λ 1-4, λ 5-8, . . . λ 29-32, etc.), and feeds the different wavelength channels to corresponding switch fabric cards through an optical backplane 106. Each switch fabric card routes transparently an optical signal of certain wavelengths, through the optical backplane 106 for a second time, to an appropriate wavelength port of corresponding egress line cards. Each egress line card multiplexes a received optical signal with respective wavelengths and further transmits it through a plurality of egress optical fibers 104. The PSN shown in FIG. 1 can switch 16 instances of 32 wavelengths from one line card to another. Much larger PSNs (e.g., 640×640) with similar attributes have been demonstrated or built.

Another prior art system is described in U.S. patent application Ser. No. 09/726,027, entitled "Protection Switching Arrangement for an Optical Switching System," filed Nov. 30, 2000, which is incorporated herein in its entirety.

To date, in long haul, optical access, and metro core applications, optical building blocks for photonic line cards have mostly been implemented with discrete components that are either stand-alone or co-packaged in a box. As the switching capacity of PSNs increases, the traditional approach can pose a number of problems. For example, as each discrete component has its own package and takes substantial space, the overall size of a photonic line card based on discrete components can be considerably large in terms of footprint. Furthermore, discrete components typically require additional optical interconnects among the components or functions. Such parasitic optical interconnects are almost always associated with extra cost, space, and deteriorating performance. As a result, a PSN based on discrete components can be bulky, expensive, hard to configure or reconfigure, and unreliable.

In view of the foregoing, it would be desirable to provide a solution for photonic switching which overcomes the above-described inadequacies and shortcomings.

SUMMARY OF THE DISCLOSURE

A technique for photonic switching is disclosed. In one particular exemplary embodiment, the technique may be realized as a method for photonic switching. The method may comprise receiving at least one optical signal at a photonic line card, wherein the at least one optical signal comprises one or more wavelength channels and the photonic line card comprises at least one integrated optical switch. The method may also comprise routing at least one of the one or more wavelength channels through the at least one integrated optical switch to a photonic bus, wherein the photonic bus comprises a plurality of optical paths and each of the plurality of optical paths is capable of carrying multiple wavelength channels.

In accordance with other aspects of this particular exemplary embodiment, the plurality of optical paths may comprise one or more optical fibers.

In accordance with further aspects of this particular exemplary embodiment, the plurality of optical paths may comprise one or more waveguides.

In accordance with additional aspects of this particular exemplary embodiment, the photonic bus may comprise at least one component selected from a group consisting of an optical backplane, a faceplate, an optical wiring harness, and optical patchcords.

In accordance with another aspect of this particular exemplary embodiment, the at least one integrated optical switch may be based on one or more optical waveguides.

In accordance with yet another aspect of this particular exemplary embodiment, the method may further comprise exchanging a plurality of optical signals, through the photonic bus, between the photonic line card and one or more additional photonic line cards.

In another particular exemplary embodiment, the technique may be realized by/as a photonic line card for photonic switching. The photonic line card may comprise at least one first interface to an optical medium. The photonic line card may also comprise at least one integrated optical switch. The photonic line card may further comprise at least one second interface to a photonic bus. The photonic bus comprises a plurality of optical paths and each of the plurality of optical paths is capable of carrying multiple wavelength channels.

In accordance with other aspects of this particular exemplary embodiment, the at least one first interface may receive at least one optical signal from the optical medium, wherein the at least one optical signal comprises one or more wavelength channels. The at least one integrated optical switch and the at least one second interface may route at least one of the one or more wavelength channels through the photonic bus.

In accordance with further aspects of this particular exemplary embodiment, the at least one second interface may receives one or more wavelength channels from the photonic bus. The at least one integrated optical switch and the at least one first interface may route at least one optical signal comprising the one or more wavelength channels to the optical medium.

In accordance with additional aspects of this particular exemplary embodiment, the at least one integrated optical switch may be based on one or more optical waveguides.

In accordance with another aspect of this particular exemplary embodiment, the photonic line card described above may be configured as a trunk line card, wherein the trunk line card is coupled with one input optical fiber and one output optical fiber through the at least one first interface and each of the input optical fiber and the output optical fiber carries one or more optical signals comprising one or more wavelength channels.

In accordance with yet another aspect of this particular exemplary embodiment, the photonic line card described above may be configured as a sparse-DWDM line card, wherein the sparse-DWDM line card is coupled with a plurality of optical fibers through the at least one first interface and each of the plurality of optical fibers carries one or more optical signals comprising one or more wavelength channels.

In accordance with still another aspect of this particular exemplary embodiment, the photonic line card described above may be configured as a tributary line card, wherein the tributary line card is coupled with a plurality of optical fibers through the at least one first interface and each of the plurality of optical fibers carries a single wavelength channel.

In yet another particular exemplary embodiment, the technique may be realized by/as a photonic switching node comprising a plurality of photonic line cards as described above, wherein the plurality of photonic line cards exchange a plurality of optical signals based on the photonic bus. One or more such photonic switching nodes may further form a photonic switching network.

In still another particular exemplary embodiment, the technique may be realized by/as a system for photonic switching. The system may comprise a photonic bus, wherein the photonic bus comprises a plurality of optical paths and each of the plurality of optical paths is capable of carrying multiple wavelength channels. The system may also comprise a plurality of photonic line cards, wherein a first photonic line card comprises at least one integrated optical switch, and exchanges one or more optical signals with a second photonic line card through the photonic bus.

In a further particular exemplary embodiment, the technique may be realized by/as a system for photonic switching. The system may comprise a plurality of photonic line cards and a photonic bus, wherein an optical channel passes through said system encounters in sequence at least the following components: a first optical switch integrated in a first photonic line card; a wavelength multiplexer integrated in the first photonic line card; the photonic bus; a wavelength demultiplexer integrated in a second photonic line card; and a second optical switch integrated in the second photonic line card.

In accordance with other aspects of this particular exemplary embodiment, the photonic bus may comprise one or more optical fibers.

In accordance with further aspects of this particular exemplary embodiment, the photonic bus may comprise one or more waveguides.

In accordance with additional aspects of this particular exemplary embodiment, the photonic bus comprises at least one component selected from a group consisting of an optical backplane, a faceplate, an optical wiring harness, and optical patchcords.

In accordance with another aspect of this particular exemplary embodiment, at least one of the first optical switch and the second optical switch may be based on one or more optical waveguides.

In accordance with yet another aspect of this particular exemplary embodiment, the plurality of photonic line cards may be selected from a group consisting of trunk line cards, sparse-DWDM line cards, and tributary line cards.

In accordance with still another aspect of this particular exemplary embodiment, the plurality of photonic line cards may comprise means for monitoring optical signals and means for controlling one or more parameters associated with the optical signals.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENT(S)

One embodiment of the present disclosure provides a two-stage photonic space-switching architecture, wherein optical signals may be carried between the space-switching stages by means of multiplexing onto a dilated photonic bus. The manufacturing complexity of prior art photonic switching techniques has been poor due to their large number of physical optical port connectors between optical components. Embodiments of the present disclosure may have a larger number of functional elements for photonic switching than prior-art systems. Yet, exemplary embodiments in accordance with the present disclosure advantageously reduce the number of physical connectors. As a result, photonic switching components in accordance with the present disclosure may be less complex to manufacture than prior-art systems.

Figure 1:
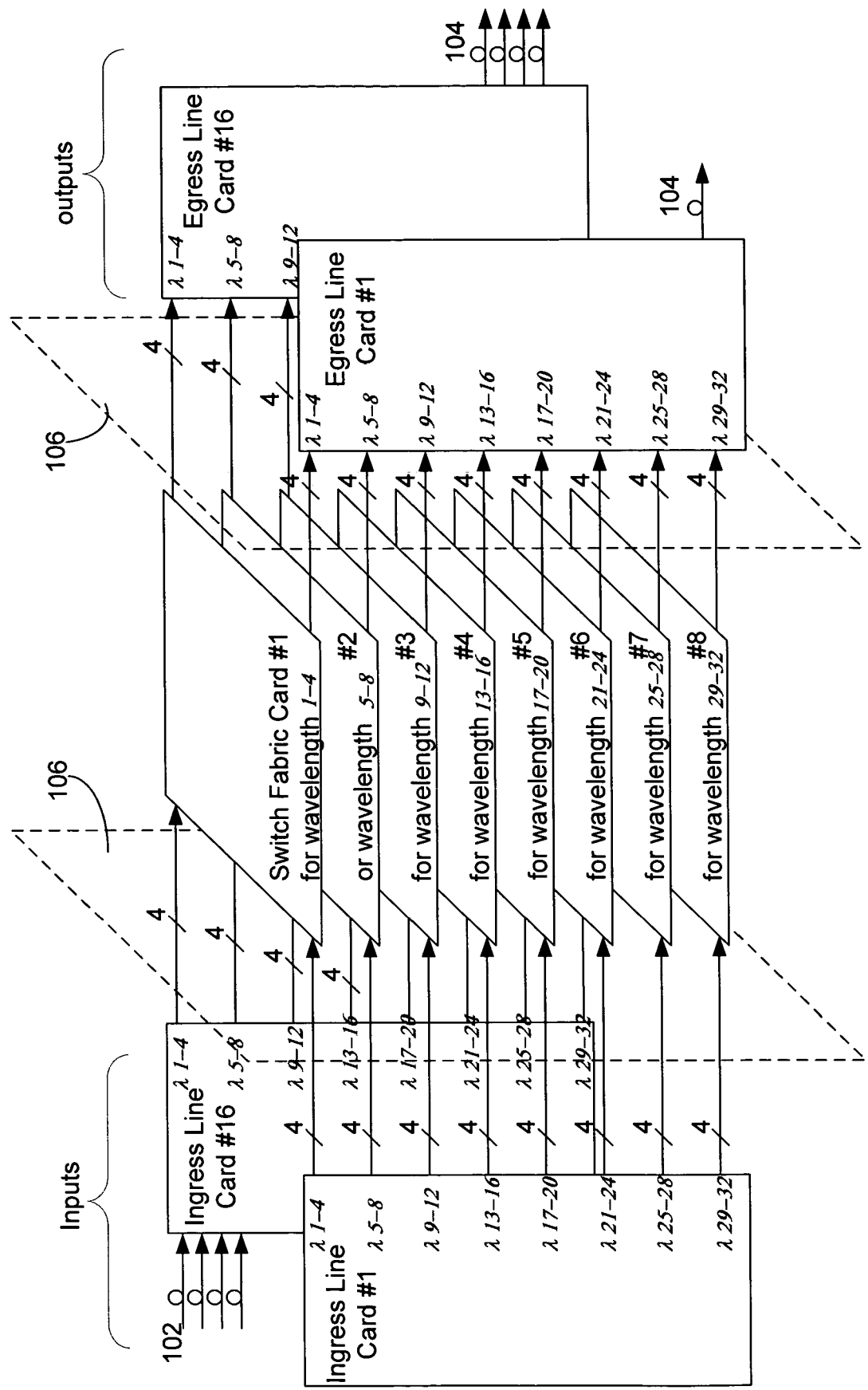
FIG. 1 illustrates a prior art photonic switching node.
Figure 2:
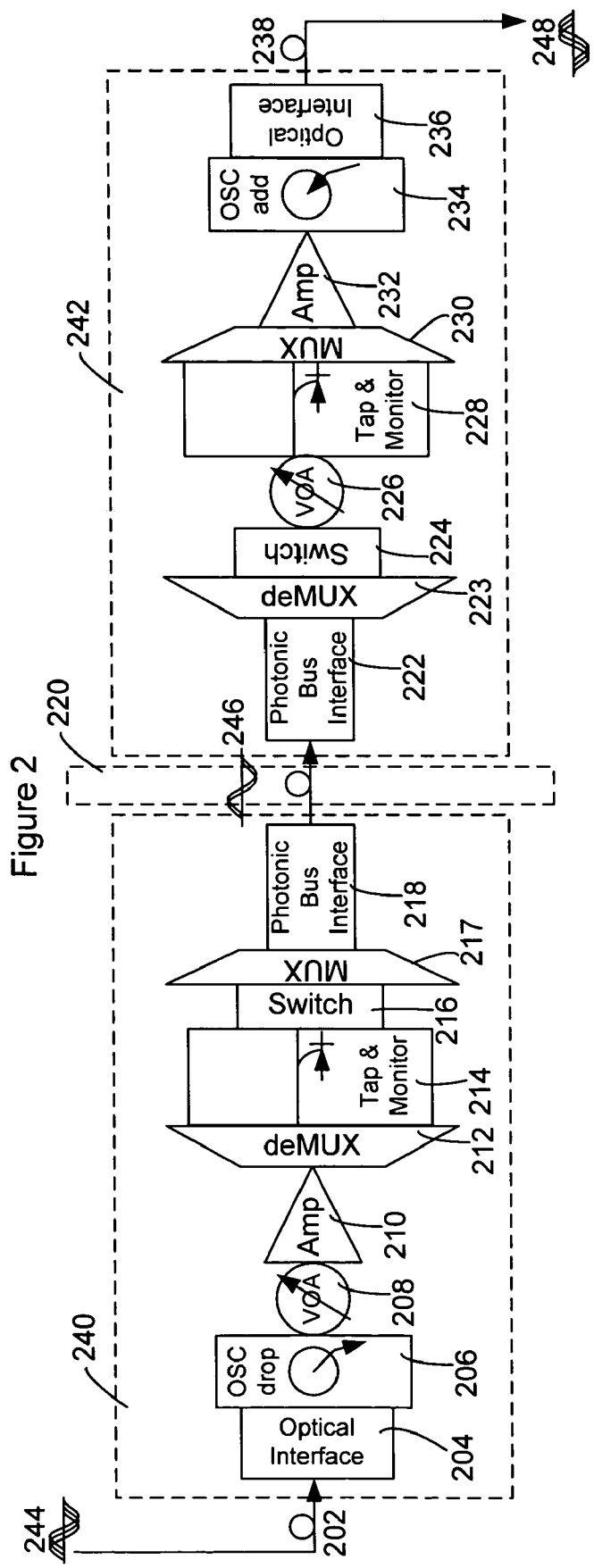
FIG. 2 is a functional diagram illustrating an exemplary method for photonic switching in accordance with an embodiment of the present disclosure.

Referring to FIG. 2, there is shown a functional diagram illustrating an exemplary technique for photonic switching in accordance with an embodiment of the present disclosure. Each presented optical card may perform photonic line interface functions such as multiplexing/de-multiplexing, amplification, optical power monitoring, and equalizing as well as a first stage of switching function. In further text, a photonic card is referred to as a "trunk line card" if this card is used between major switch nodes, a "Sparse-DWDM line card" if it is used between switching nodes and aggregated remote electro-optical termination equipment, or a "tributary line card", if it is used between switch node and electro-optic termination equipment. Although FIG. 2 only shows a "trunk line card to trunk line card" scenario, the exemplary technique is applicable or adaptable to photonic switching between any types of photonic line cards such as trunk line cards, sparse-DWDM line cards, and tributary line cards.

In FIG. 2, a first photonic line card 240 and a second photonic line card 242 may be interconnected by a photonic bus 220. The photonic bus 220 may comprise a plurality of optical signal paths (e.g., optical fibers or planar optical waveguides) each of which is capable of carrying multiple wavelength channels. Optical signals may be exchanged between any two photonic line cards (e.g., 240 and 242) that are coupled to the photonic bus, in a way similar to the exchange of electrical signals on an electrical bus coupled to a microprocessor or computer. According to embodiments of the present disclosure, the photonic bus 220 may comprise an optical backplane or faceplate, an optical wiring harness, or optical patchcords. The photonic line cards 240 and 242 may comprise integrated optical switches 216 and 224, among other integrated functions. That is, instead of providing switch functions through one or more stand-alone photonic switch fabric cards, the optical switches may be integrated into the photonic line cards. Furthermore, the optical switches may be based on planar optical waveguides. For example, the optical switch 216 may be integrated with a demultiplexer 212, a tap & monitor module 214, a multiplexer 217, and a photonic bus interface 218 to form a waveguide-based component known as a hybrid or monolithic optical integrated circuit (HOIC or MOIC) or "integrated optical chip" which performs multiple network functions. Monolithic integration exploits the ability of constructing the "integrated optical chip" with multiple optical functions on a common substrate made of a single material system, versus hybrid integration which exploits the ability of constructing the "integrated optical chip" as a multi-chip-module. An integrated optical switch may comprise a plurality of optical switches that form switch matrices based on a plurality of optical planar lightwave circuits (PLC) and associated electrical circuitry, providing switching and/or routing functions for optical signals.

In operation, the first photonic line card 240 may receive an optical signal 244 from an ingress optical fiber 202 via an optical interface 204 (e.g., a faceplate connector). The optical signal 244 may be a DWDM signal comprising multiple wavelength channels, including an optical supervisory channel or optical service channel (OSC). Fiber management information in the OSC may be filtered by an OSC-drop module 206. Then, the power of the optical signal 244 may be attenuated by a first variable optical attenuator (VOA) 208. The optical signal 244 may then be amplified by a first optical amplifier 210. Next, individual wavelength channels of the optical signal 244 may be separated by a demultiplexer 212. Each wavelength channel may be measured by optical taps and optical monitors in a first tap & monitor module 214. The integrated optical switch 216 may route wavelength channels 246 to the second photonic line card 242 via the multiplexer 217, a first photonic bus interface 218 (e.g., a backplane connector), the photonic bus 220, a second photonic bus interface 222, and a demultiplexer 223. The integrated optical switch 224 may select one or more demultiplexed wavelength channels and pass them on for subsequent signal processing such as power attenuation by a second VOA 226, measurement by a second tap & monitor module 228, multiplexing by a multiplexer 230, and amplification by a second optical amplifier 232. Then an OSC may be added to the multiplexed optical signal by an OSC-add module 234. An output signal 248 may be transmitted to an egress optical fiber 238 via an optical interface 236 (e.g., a faceplate connector).

Based on the exemplary method as illustrated in FIG. 2, the switching of optical signals no longer requires a separate switch card. Instead, the switching function may be integrated with one or more other functions within a photonic line card, reducing the number of optical interconnects. This may result in a highly modular photonic switch node that is also scalable.

Figure 3:
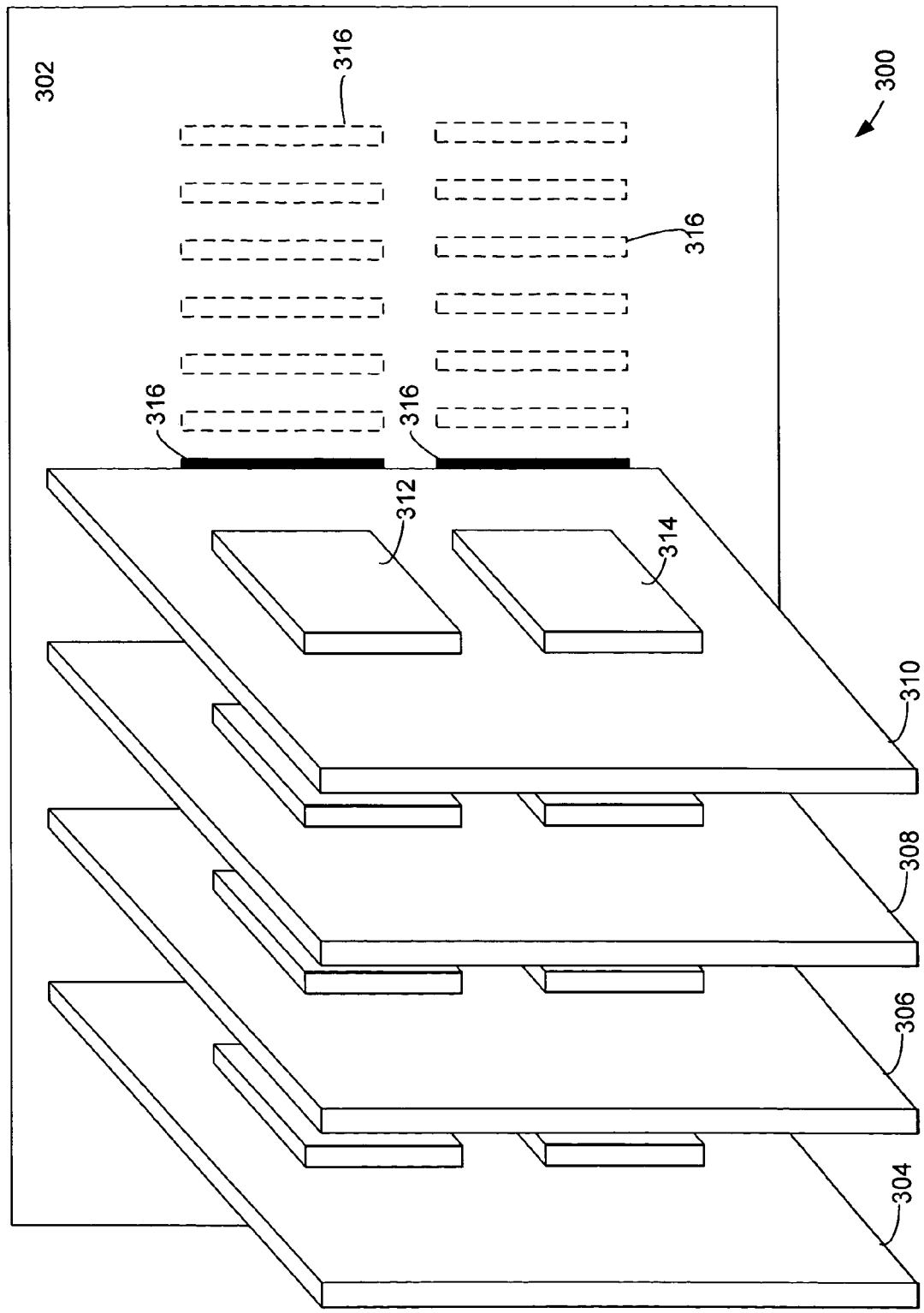
FIG. 3 illustrates an exemplary physical layout of a photonic switching node in accordance with an embodiment of the present disclosure.

FIG. 3 illustrates an exemplary physical layout of a photonic switching node 300 in accordance with an embodiment of the present disclosure. The PSN 300 may comprise a passive optical backplane 302 and a plurality of photonic line cards (e.g., 304, 306, 308 and 310). The optical backplane 302 may comprise optical connectors 316 in which the photonic line cards may be plugged. Each photonic line card (e.g., 310) may comprise interface functions for coupling with the optical backplane 302, and at least one stage of switch function (e.g., ingress switch module 312 and egress switch module 314). There is no stand-alone switch card. Optical signals that are switched from one photonic line card to another may pass only once through the passive optical backplane 302. According to embodiments of the disclosure, a PSN may comprise multiple photonic buses each being coupled with multiple photonic line cards. For example, the exemplary physical layout shown in FIG. 3 may be repeated within a PSN to provide multiple stages of switching.

Figure 4:
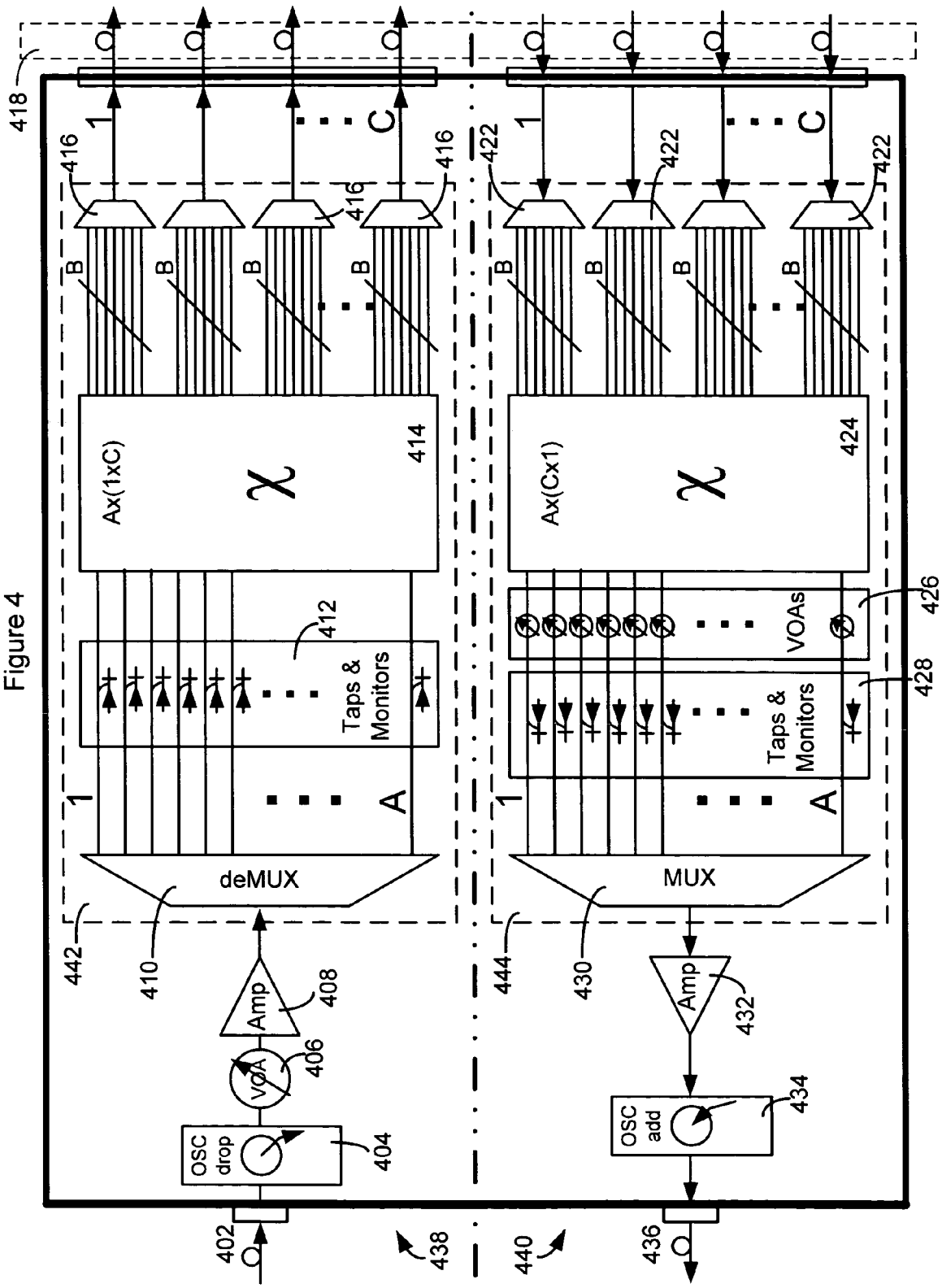
FIG. 4 is a functional diagram illustrating an exemplary trunk line card for photonic switching in accordance with an embodiment of the present disclosure.

FIG. 4 is a functional diagram illustrating an exemplary trunk line card for photonic switching in accordance with an embodiment of the present disclosure. The exemplary trunk line card may comprise an ingress half 438 and an egress half 440.

The ingress half 438 may comprise an OSC-drop module 404, a VOA 406, an optical amplifier 408, and an integrated optical chip 442 (e.g., a planar waveguide-based chip) which comprises an [A]-output demultiplexer 410, taps and monitors 412, [C] multiplexers 416 each having [B] inputs, and an optical switching block 414 with [A] independent (1×C) switch functions, where A, B and C are integers. [A] may equal [B] for a strictly non-blocking configuration, though it is also possible for [B] to be less than [A]. [C] is typically the same as or one less than the number of line card directions available for switching. The ingress half 438 may receive a DWDM signal from an ingress fiber 402 and demultiplex the signal into as many as [A] wavelength channels. The taps and monitors 412 may measure the demultiplexed wavelength channels. Then, the optical switching block 414 may route the demultiplexed wavelength channels to the [C] multiplexers 416. The multiplexers 416 may multiplex the received demultiplexed wavelength channels and transmit multiplexed optical signal to other photonic line cards via an optical backplane 418.

The egress half 440 may comprise an OSC-add module 434, an optical amplifier 432, and an integrated optical chip 444 which comprises [C] demultiplexers 422 each having [B] outputs, an optical switching block 424 with [A] independent (C×1) switch functions, VOAs 426, taps and monitors 428, and an [A]-input multiplexer 430. The egress half 440 may receive as many as [C] optical signals from other photonic line cards via the optical backplane 418 and demultiplex each of these optical signals into as many as [B] wavelength channels. Then, the optical switching block 424 may route the demultiplexed wavelength channels. The routed wavelength channels may be processed by the VOAs 426 and the taps and monitors 428. The multiplexer 430 may then multiplex these wavelength channels. The optical amplifier 432 and the OSC-add module 434 may process the multiplexed optical signal before it is transmitted through an egress fiber 436.

Figure 9:
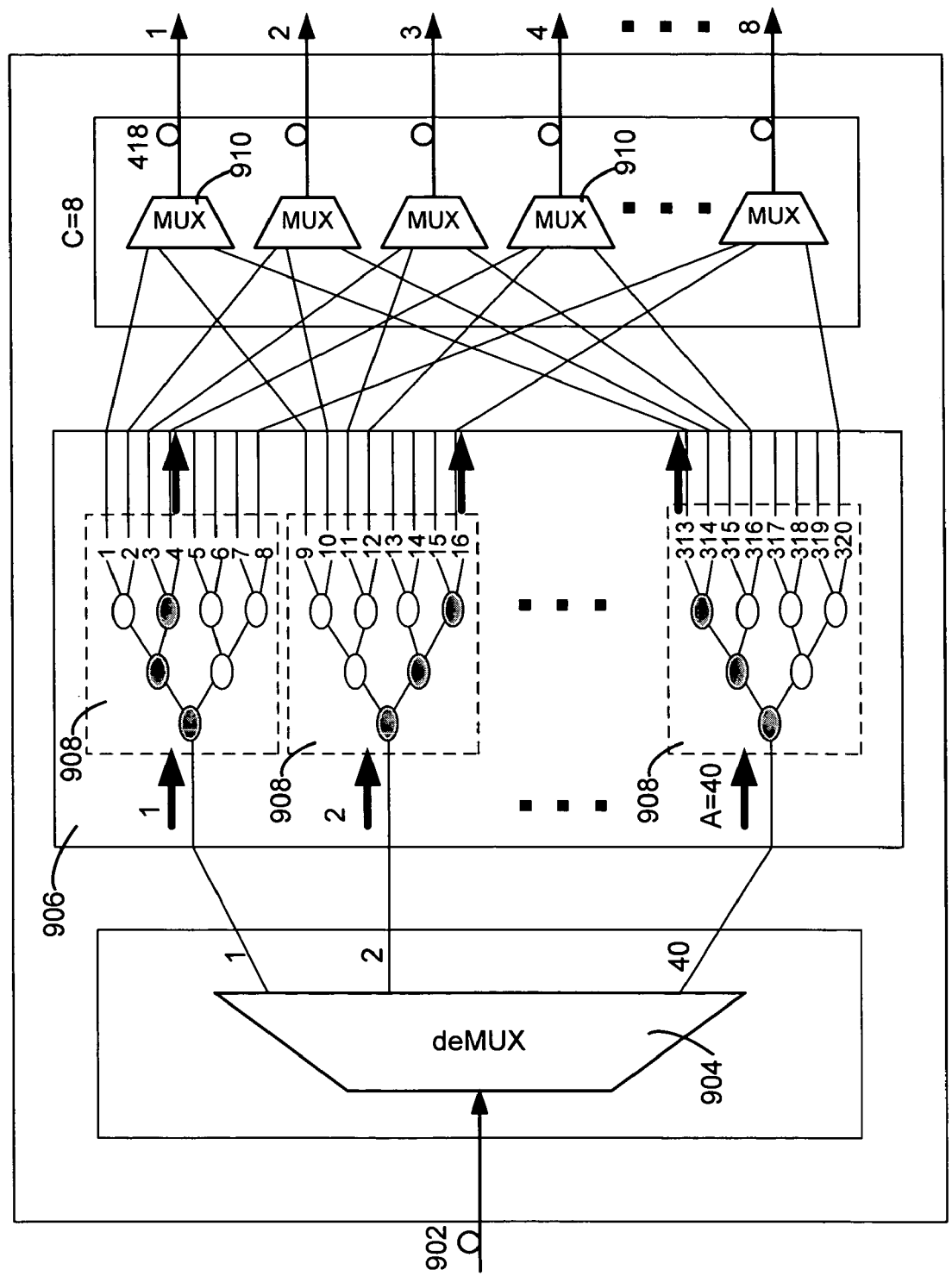
FIG. 9 is a functional diagram illustrating the internal switching of an exemplary trunk line card for photonic switching in accordance with an embodiment of the present disclosure.

The internal switching may be better understood with reference to FIG. 9 where there is shown a functional diagram illustrating the internal switching of an exemplary trunk line card for photonic switching in accordance with an embodiment of the present disclosure. FIG. 9 shows only the ingress portion of the exemplary trunk line card. The ingress portion may comprise a demultiplexer 904 which receives an input optical signal from an ingress fiber 902 and demultiplexes the optical signal into A=40 wavelength channels. An optical switching block 906 may then route each of the 40 wavelength channels through 40 (1×8) integrated switches 908. Each integrated switch 908 may have its outputs coupled to C=8 multiplexers 910. Then, each multiplexer 910 may output a multiplexed optical signal to another photonic line card (not shown) via a photonic bus (not shown). This multiplexed optical signal may comprise one or more of the A=40 wavelength channels.

Figure 5:
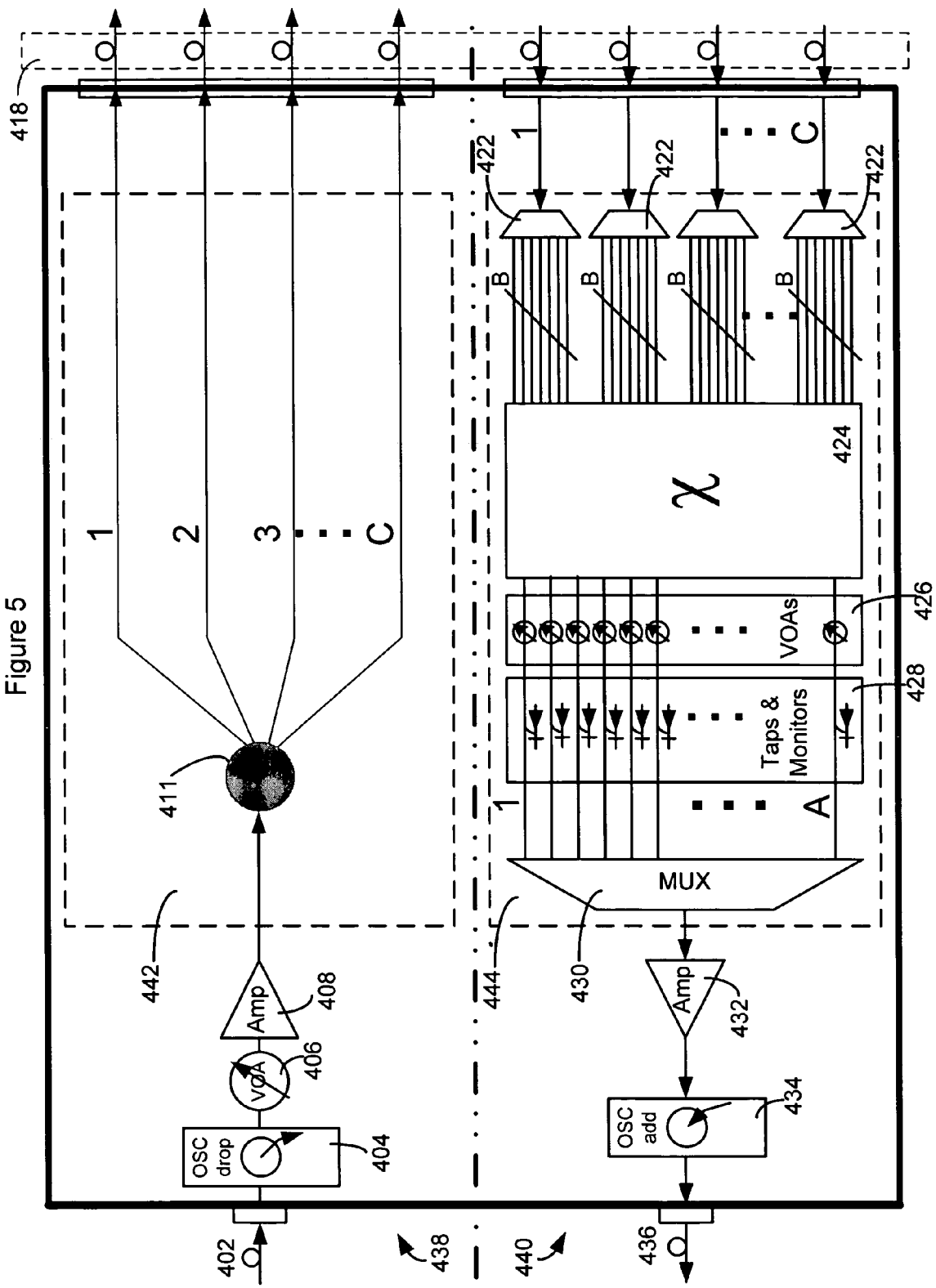
FIG. 5 is a functional diagram illustrating another exemplary trunk line card for photonic switching in accordance with an embodiment of the present disclosure.

Other configurations of the trunk line card are also possible. For example, FIG. 5 shows a functional diagram illustrating another exemplary trunk line card for photonic switching in accordance with an embodiment of the present disclosure. In this exemplary trunk line card, the switch functions in the integrated optical chip 442 on the ingress side of the trunk line card of FIG. 4 may be replaced by a star coupler (or simple power splitter) 411. Thus, any input optical signal may be simply split and transmitted to other photonic line cards via the optical backplane 418. Similarly, in a further embodiment (not shown), the integrated optical chip 444 of the egress portion of the trunk line card of FIG. 4 may be replaced by a star coupler (or simple power combiner).

Figure 6:
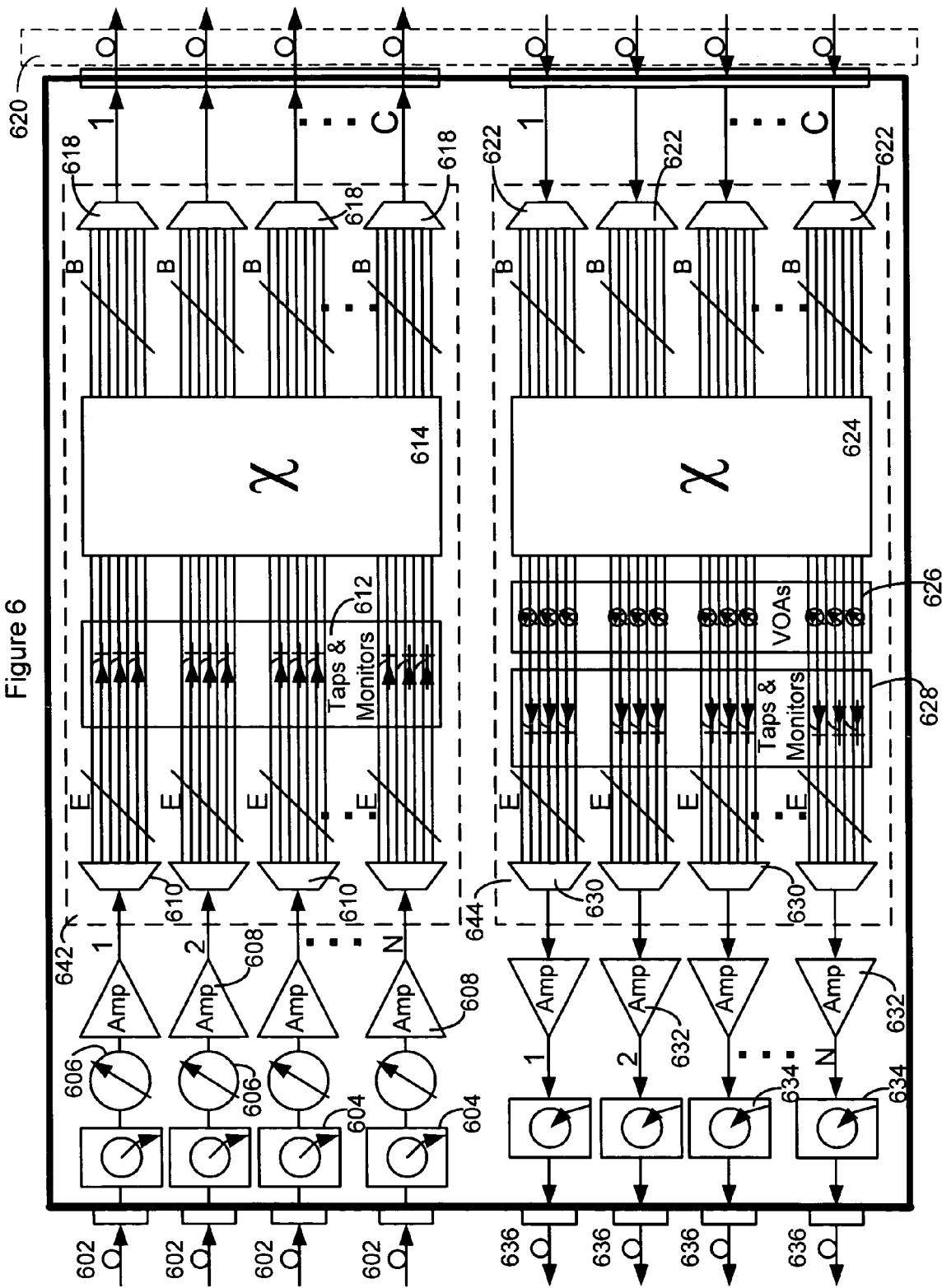
FIG. 6 is a functional diagram illustrating an exemplary sparse-DWDM line card for photonic switching in accordance with an embodiment of the present disclosure.

FIG. 6 is a functional diagram illustrating an exemplary sparse-DWDM line card for photonic switching in accordance with an embodiment of the present disclosure. A sparse-DWDM line card is similar to a trunk line card, except that it interfaces with a plurality of optical fibers each carrying multiple wavelength channels. FIG. 6 illustrates a non-blocking embodiment in which different ingress fibers 602 do not have any instance of the same wavelength.

On the ingress side, N optical signals may be received from the ingress fibers 602 and processed by OSC-drop modules 604, VOAs 606, and optical amplifiers 608. Each of the [N] signals may then be demultiplexed by demultiplexers 610 each having [E] outputs, where N and E are integers. The total number of demultiplexed wavelength channels may be A=N*E. After optical power measurements performed by taps and monitors 612, the demultiplexed wavelength channels may be switched by an optical switching block 614 comprising [A] independent (1×C) switch functions. The switched wavelength channels may then be multiplexed again by [C] multiplexers 618 each having [B] inputs, and transmitted to other photonic line cards via an optical backplane 620. The demultiplexers 610, taps and monitors 612, optical switching block 614, and multiplexers 618 may be one integrated component 642.

On the egress side, [C] optical signals may be received from other photonic line cards via the optical backplane 620. Each of the [C] signals may be demultiplexed by demultiplexers 622 each having [B] outputs. The total number of demultiplexed wavelength channels may be A=B*C. The demultiplexed wavelength channels may be switched by an optical switching block 624 comprising [A] independent (C×1) switch functions. The switched wavelength channels may then be processed by the VOAs 626, taps and monitors 628, and multiplexed by [N] multiplexers 630 each having [E] inputs. The multiplexed optical signals may then be amplified by optical amplifiers 634, have OSC added by OSC-add modules 634, and transmitted through egress fibers 636. The demultiplexers 622, optical switching block 624, VOAs 626, taps and monitors 628, and the multiplexers 630 may be one integrated component 644.

Figure 7:
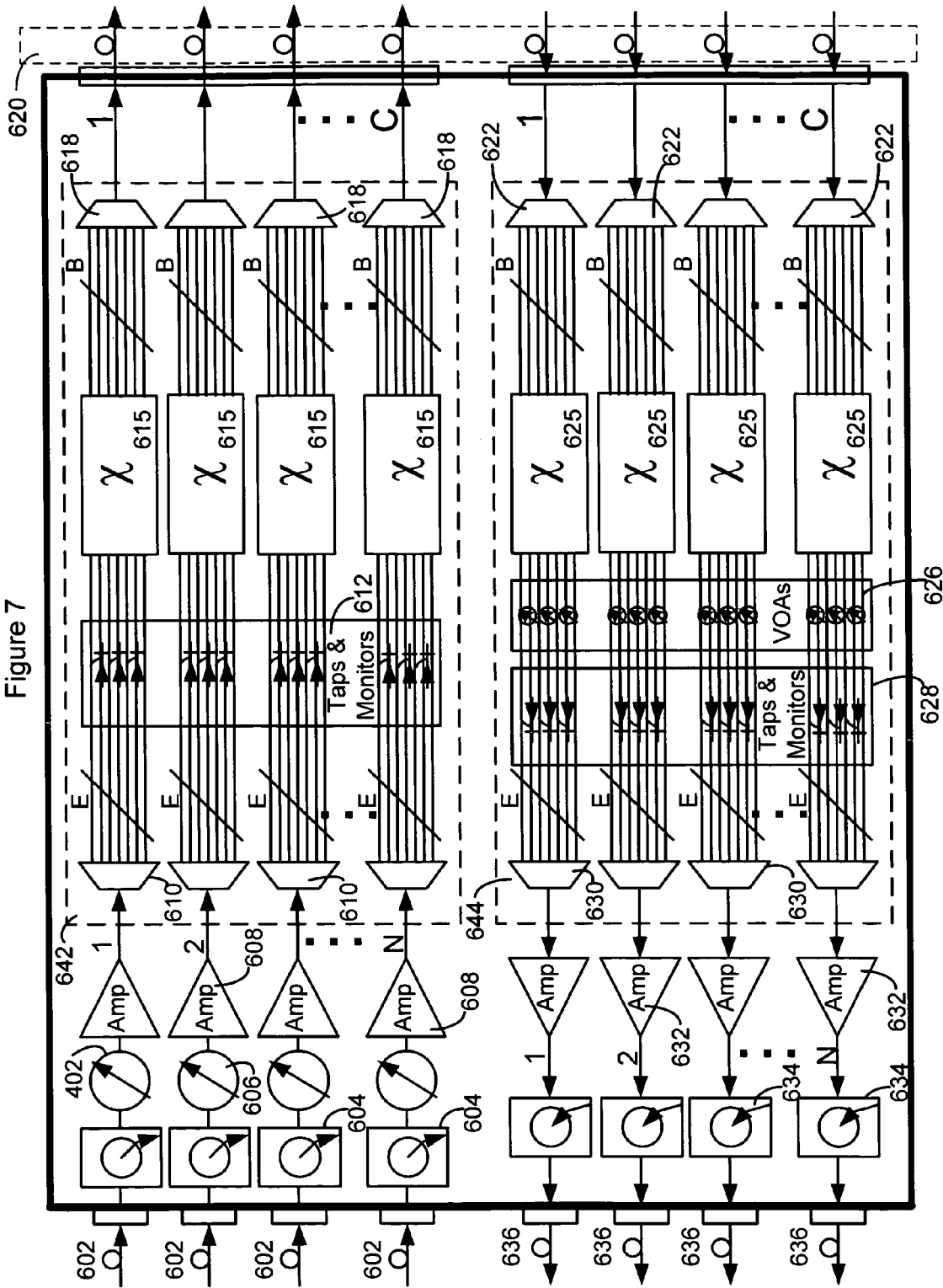
FIG. 7 is a functional diagram illustrating another exemplary sparse-DWDM line card for photonic switching in accordance with an embodiment of the present disclosure.

FIG. 7 is a functional diagram illustrating another exemplary sparse-DWDM line card for photonic switching in accordance with an embodiment of the present disclosure. In this embodiment, different ingress fibers 602 may have instances of the same wavelength. Accordingly, the optical switching block 614 in FIG. 6 may now be replaced with [N] switching blocks 615 each having [A] independent (1×C) switch functions, and the optical switching block 624 may be replaced with [N] switching blocks 625 each having [A] independent (C×1) switch functions.

Figure 8:
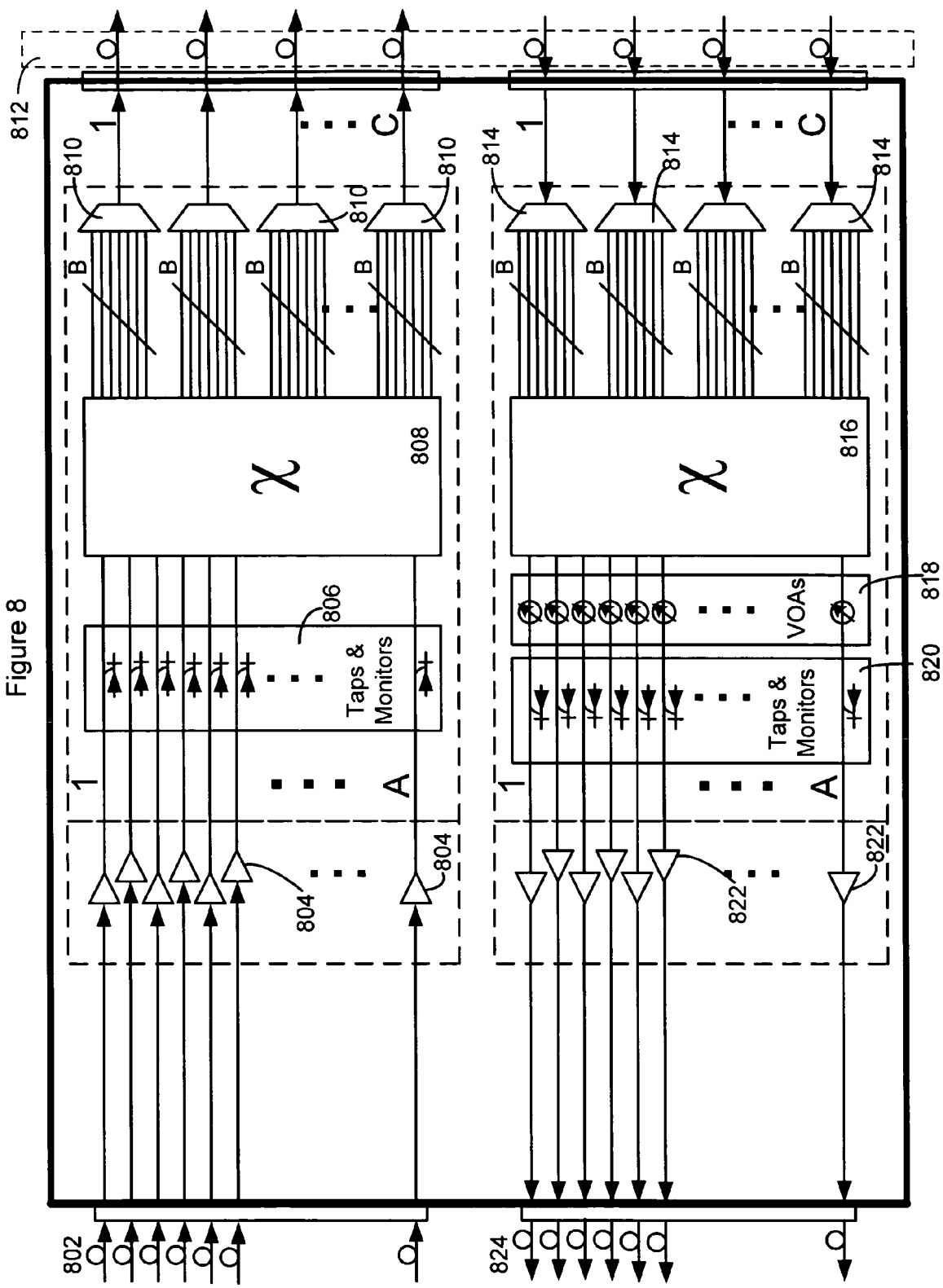
FIG. 8 is a functional diagram illustrating an exemplary tributary line card for photonic switching in accordance with an embodiment of the present disclosure.

FIG. 8 is a functional diagram illustrating an exemplary tributary line card for photonic switching in accordance with an embodiment of the present disclosure. A tributary line card is similar to a trunk line card, except that it interfaces with a plurality of optical fibers each carrying one wavelength channel. FIG. 8 illustrates a non-blocking embodiment in which different ingress fibers 802 do not have any instance of the same wavelength. Since each ingress fiber 802 carries only one wavelength channel, there is no need for demultiplexers. [A] incoming optical signals may be amplified by optical amplifiers 804 (optional), measured by taps and monitors 806, and then switched by an optical switching block 808. The switched wavelength channels may be multiplexed by multiplexers 810 and transmitted to an optical backplane 812. On the egress side, optical signals received from the optical backplane 812 may be demultiplexed before being switched by an optical switching block 816. The [A] switched wavelength channels may then be processed by VOAs 818, taps and monitors 820, and optical amplifiers 822 to generate [A] output optical signals. The

[A] output optical signals may then be transmitted through egress fibers 824 without being multiplexed.

Figure 10:
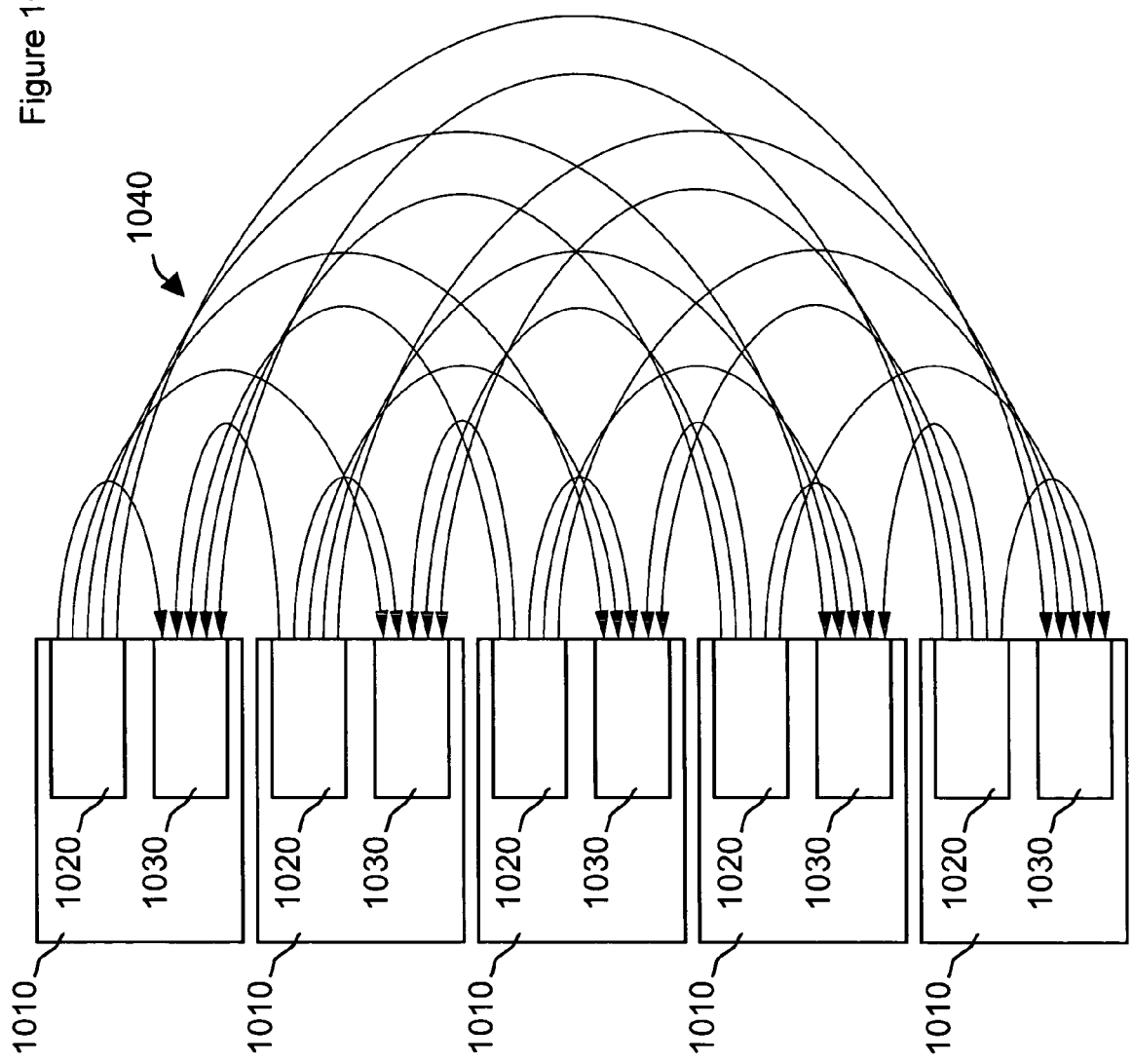
FIG. 10 is a functional diagram illustrating exemplary connections among line cards within a photonic switch in accordance with an embodiment of the present disclosure.

FIG. 10 is a functional diagram illustrating exemplary connections among line cards within a photonic switch in accordance with an embodiment of the present disclosure. In FIG. 10, there are shown five identical line cards 1010, each having an ingress portion 1020 and an egress portion 1030. The ingress portion 1020 of each line card 1010 may be connected, via optical fibers or waveguides, to its own egress portion 1030 as well as the egress portions 1030 of other line cards. The resulting array of optical fibers or waveguides may form an optical backplane 1040, wherein each fiber or waveguide serves to convey a plurality of wavelengths channels from the ingress portion of one line card to the egress portion of a same or different line card. The line cards 1010 may be an embodiment of the trunk line card illustrated in FIG. 4, for the case of C=5. In the embodiment illustrated in FIG. 10, the ingress portion of a given line card 1010 is connected to the egress side of the same line card 1010, so as to enable a loopback function. In other embodiments (not shown), the loopback capability may not be provided by the optical backplane.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the following appended claims. Further, although the present disclosure has been described herein in the context of a particular implementation in a particular environment for a particular purpose, those of ordinary skill in the art will recognize that its usefulness is not limited thereto and that the present disclosure can be beneficially implemented in any number of environments for any number of purposes. Accordingly, the claims set forth below should be construed in view of the full breadth and spirit of the present disclosure as described herein.

The invention claimed is:

1. A method for photonic switching, the method comprising:
    coupling a first photonic line card and a second photonic line card to a photonic bus having a plurality of optical paths, wherein at least one of the first photonic line card and the second photonic line card comprises at least one integrated optical switch;
    receiving at least one optical signal at the first photonic line card, wherein the at least one optical signal comprises one or more wavelength channels; and
    routing at least one of the one or more wavelength channels from the first photonic line card to the second photonic line card via the photonic bus without passing through any intermediate active switching device between the first photonic line card and the second photonic line card, wherein the at least one of the one or more wavelength channels is processed by the at least one integrated optical switch.

2. The method according to claim 1, wherein the plurality of optical paths comprise one or more optical fibers.

3. The method according to claim 1, wherein the plurality of optical paths comprise one or more waveguides.

4. The method according to claim 1, wherein the photonic bus comprises at least one component selected from a group consisting of:
    an optical backplane;
    a faceplate;
    an optical wiring harness; and
    optical patchcords.

5. The method according to claim 1, wherein the at least one integrated optical switch is based on one or more optical waveguides.

6. The method according to claim 1 further comprising:
    exchanging a plurality of optical signals, through the photonic bus, among the first photonic line card, the second photonic line card, and one or more additional photonic line cards.

7. A method for photonic switching, the method comprising:
    coupling a photonic line card to a photonic bus having a plurality of optical paths, wherein the photonic line card comprises at least one integrated optical switch;
    receiving at least one optical signal at a first portion of the photonic line card, wherein the at least one optical signal comprises one or more wavelength channels; and
    routing at least one of the one or more wavelength channels from the first portion to a second portion of the photonic line card via the photonic bus without passing through any intermediate active switching device, wherein the at least one of the one or more wavelength channels is processed by the at least one integrated optical switch.

8. The method according to claim 7, wherein the plurality of optical paths comprise one or more optical fibers.

9. The method according to claim 7, wherein the plurality of optical paths comprise one or more waveguides.

10. The method according to claim 7, wherein the photonic bus comprises at least one component selected from a group consisting of:
    an optical backplane;
    a faceplate;
    an optical wiring harness; and
    optical patchcords.

11. The method according to claim 7, wherein the at least one integrated optical switch is based on one or more optical waveguides.

12. The method according to claim 7, further comprising:
    exchanging a plurality of optical signals, through the photonic bus, among the first portion of the photonic line card, the second portion of the photonic line card, and one or more additional portions of the photonic line card.

* * * * *